(No Model.)

S. DAVIS.
CAR TRUCK.

No. 376,077.  Patented Jan. 10, 1888.

Witnesses.
John F. C. Prinkert
Howard F. Eaton

Inventor:
Samuel Davis.
by Crosby & Gregory
Attys.

UNITED STATES PATENT OFFICE.

SAMUEL DAVIS, OF MONTREAL, QUEBEC, CANADA.

CAR-TRUCK.

SPECIFICATION forming part of Letters Patent No. 376,077, dated January 10, 1888.

Application filed August 30, 1887. Serial No. 248,282. (No model.)

*To all whom it may concern:*

Be it known that I, SAMUEL DAVIS, of Montreal, Province of Quebec, Canada, have invented an Improvement in Car-Trucks, of which the following description, in connection with the accompanying drawings, is a specification, like letters on the drawings representing like parts.

This invention has for its object to prevent the trucks "slewing" or turning to a greater extent than demanded by the maximum curvature of the track, so that in case of derailment the truck will be kept under the car in running position.

In this my invention the car-truck, near its end, is joined to the under side of the car-body by pieces of wire rope extended longitudinally of the car, the combination of the parts and their construction and operation being such as to permit the car-truck to turn under the car-body sufficiently to enable the truck to slew or turn for the maximum curve in the track, and thereafter serve as stops or checks to any further turning.

By the employment of a wire rope having flexibility instead of a rod, which has heretofore been used, I am enabled to secure greater strength in the connections, and at the same time have connections less liable to be bent or wrenched asunder by a blow or sudden strain. I have also provided the truck and car with a set of auxiliary connections, which supplement the action of the main connections, when, for instance, a wheel meets a sleeper, or some other obstruction on the track.

Figure 1:
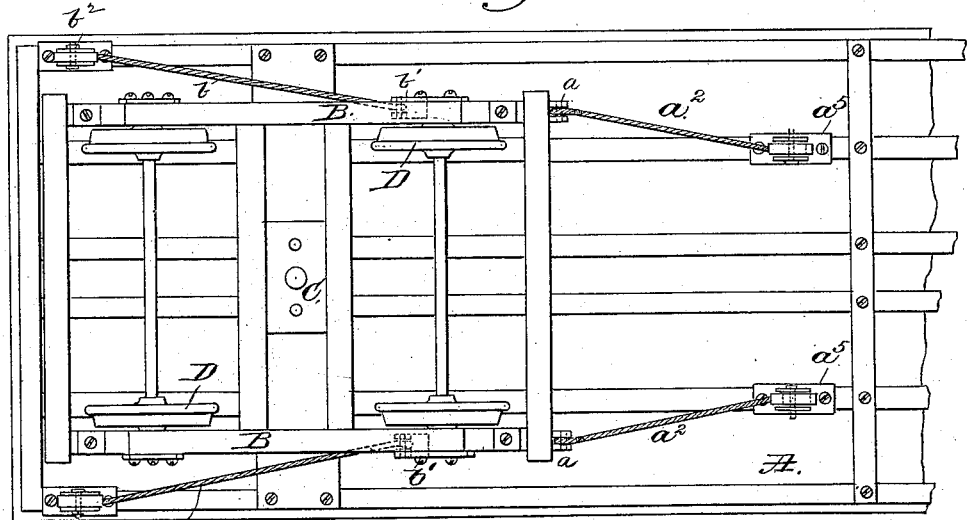
Figure 2:
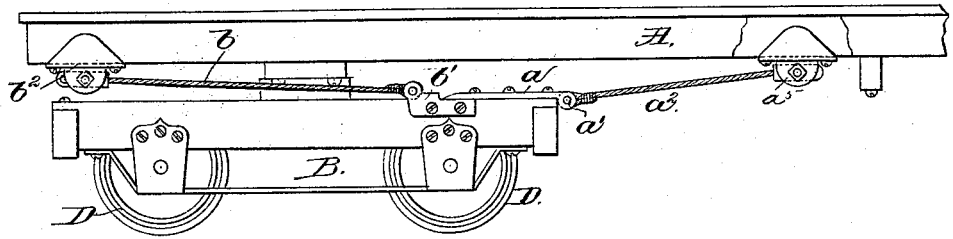
Figure 3:
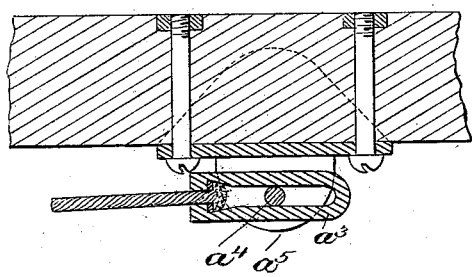

Figure 1 is an under side view of a sufficient portion of a railway-car to enable my improvements to be understood; Fig. 2, a side elevation of a portion of the car shown in Fig. 1, and Fig. 3 a detail to be referred to.

The car-body A, truck B, pivoted at C and having wheels D, are and may be all as usual.

The truck has bolted to it at or near its corners brackets or stands $a$, having strong bolts $a'$, with which is engaged one end of each of the connections $a^2$, made of strong wire rope or cable, the opposite ends of the said connections, as herein shown, being extended through or suitably attached to a slotted metallic loop or eye, as $a^3$, fitted to slide to a limited extent on a strong bolt, $a^4$, extended through the ears of a stand, $a^5$, bolted to the frame-work of the car-body, the length of the slot in the loop or eye forming a part of the wire rope being sufficient to permit the truck to turn under the car-body to accommodate the truck to the maximum curvature of the track on which the truck is to run.

In case of an obstruction on the track, or the derailment of the truck, or the striking of a wheel against a tie, the longitudinally-arranged connections between the car-body and truck prevent the latter slewing about, and as the truck cannot slew it must keep its leading end forward in running position.

The blow of the wheel of a rapidly-running car against an obstruction on a track or against a tie is very great; so to afford additional security and safety I have added to the car an auxiliary set of connections, as $b$, also preferably made of wire rope, so constructed or attached at opposite ends to the car-body and truck as to permit the truck to turn under the car-body for a determined distance, and then act as stops to any further turning of the truck.

The auxiliary connections $b$ are joined to the stands $b'$ $b^2$, or bolts thereon attached, respectively, to the truck and car-body.

I claim—

1. The car-body, the stands $a^5$, containing bolts $a^4$ and attached to the car-body near its sides, the truck and its attached stands $a'$ and bolts $a$, combined with the slotted metallic loops or eyes $a^3$ and with the two independent longitudinally-arranged flexible connections $a^2$, composed of wire rope operatively joined, respectively, to the truck and to the car-body, to permit the truck to swing and accommodate itself to the maximum curvature of the track, and thereafter serve as stops to prevent further turning of the said trucks, substantially as described.

2. The car-truck and the car-body pivoted thereto, combined with two sets of flexible connections, $a^2$ $b$, composed of wire rope having attached slotted eyes and extended longitudinally from the truck in opposite directions, and connected, substantially as described, to the car-body and to the corners and sides of the truck, to operate all substantially as described.

In testimony whereof I have signed my name to this specification in the presence of two subscribing witnesses.

SAMUEL DAVIS.

Witnesses:
G. W. GREGORY,
C. M. CONE.